United States Patent [19]
Kniel

[11] 3,849,096
[45] Nov. 19, 1974

[54] FRACTIONATING LNG UTILIZED AS REFRIGERANT UNDER VARYING LOADS

[75] Inventor: Ludwig Kniel, Scarsdale, N.Y.

[73] Assignee: The Lummus Company, Bloomfield, N.J.

[22] Filed: Aug. 4, 1971

[21] Appl. No.: 168,838

Related U.S. Application Data

[63] Continuation of Ser. No. 839,427, July 7, 1969, abandoned.

[52] U.S. Cl. .............................. 62/23, 62/27, 62/28
[51] Int. Cl. ............................................... F25j 3/06
[58] Field of Search ............... 62/52, 23, 24, 27, 28, 62/21, 40; 208/351, 353

[56] References Cited
UNITED STATES PATENTS

| | | | |
|---|---|---|---|
| 2,029,501 | 2/1936 | Page | 208/353 |
| 2,127,004 | 8/1938 | Nelson | 62/28 |
| 3,261,189 | 7/1966 | Harmens | 62/28 |
| 3,405,530 | 10/1968 | Denahan et al. | 208/351 |
| 3,524,897 | 8/1970 | Kniel | 62/28 |

Primary Examiner—Norman Yudkoff
Assistant Examiner—F. Sever
Attorney, Agent, or Firm—Marn and Jangarathis

[57] ABSTRACT

Process for recovering heavier components from liquefied natural gas during regasification thereof to provide a send-out gas at varying rates in which the heavier components are to be treated in an extraneous process at a constant feed rate. The heavier components recovered from the liquefied natural gas are passed to storage during periods when the rate is higher than the average send-out rate and the stored heavier components fed to the extraneous process during periods when the send-out rate is below the average send-out rate.

2 Claims, 1 Drawing Figure

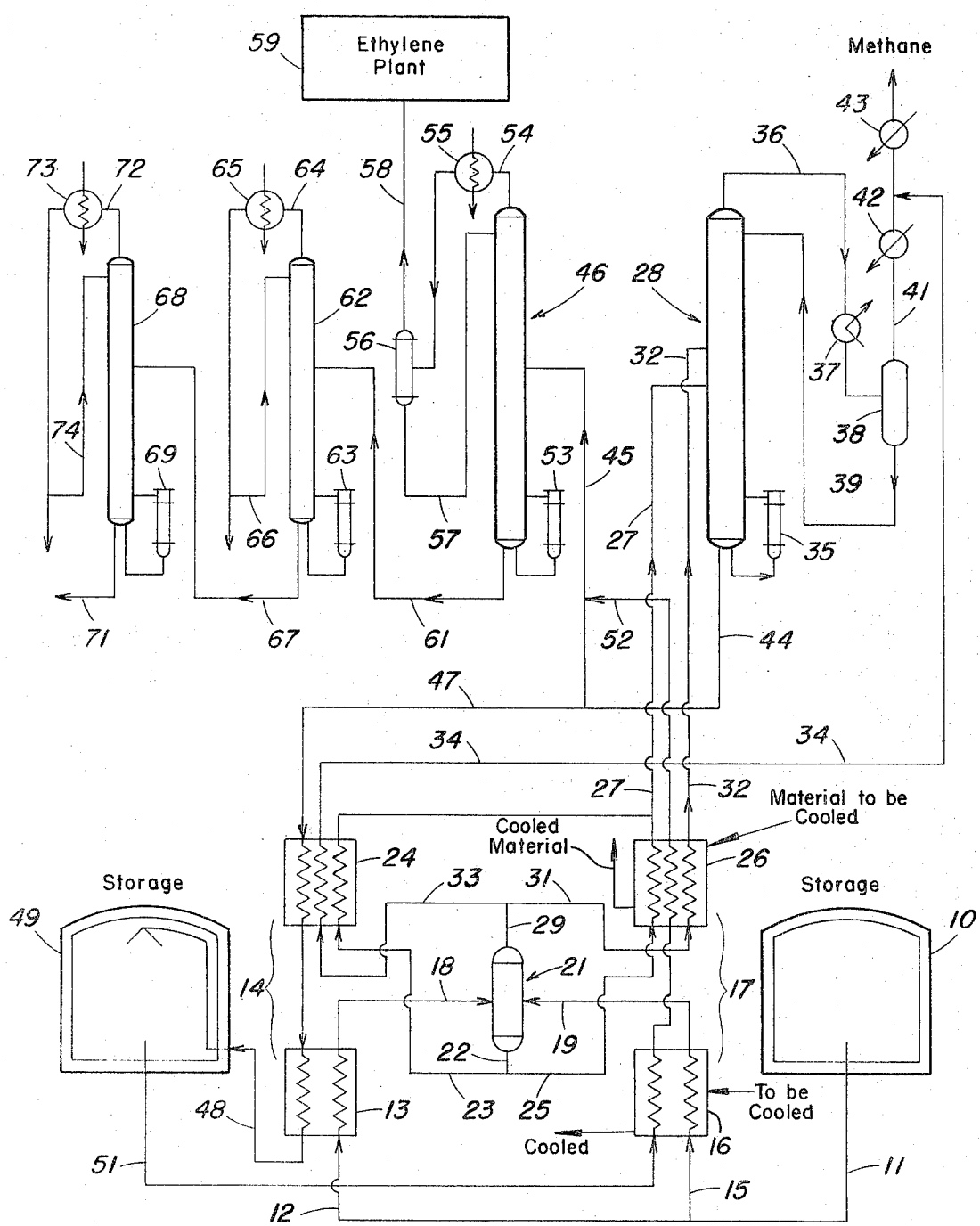

FRACTIONATING LNG UTILIZED AS REFRIGERANT UNDER VARYING LOADS

This is a continuation of application Ser. No. 839,427, filed July 7, 1969 and now abandoned.

This invention relates to a plant and process for recovering the normally gaseous components of a liquefied gas and, more particularly, to a plant and process for combining the regasification of liquefied natural gas with the production of ethylene.

The regasification of a gas may be combined with a fractionation procedure, wherein the separated components of the gas may be utilized in different operations. Thus, in application Ser. No. 316,048, filed Oct. 14, 1963 by the same inventor, hereby incorporated by reference, a process is described wherein the regasification of liquefied natural gas is combined with the production of ethylene. In such a process, liquefied natural gas is regasified and fractionated to separate methane and heavier hydrocarbons therefrom, with the ethane fraction being used as a feed in a pyrolysis unit for the production of ethylene. In addition, the caloric potential (cold potential) of the liquefied natural gas is recovered and used for performing refrigeration duties in both the fractionation of the natural gas and the separation and recovery of ethylene from a pyrolysis gas mixture.

Certain problems arise, however, in combining the regasification of a natural gas with the production of ethylene. For example, an ethylene plant must be operated at a nearly constant feed rate and, thus, cannot follow variations in liquefied natural gas send-out rate caused by changes in momentary gas demand. This can amount to a possible variation in the order of 200 to 300 percent in the course of a day. Since the ethylene plant cannot operate under such variations, it was heretofore necessary to design the plant to correspond to the minimum daily natural gas delivery volume, thus reducing overall ethylene production.

Accordingly, an object of this invention is to provide a plant and process for recovering the normally gaseous components of a liquefied gas at varying send-out rates.

Another object of this invention is to provide a process for recovering the fractions of liquefied natural gas at varying send-out rates.

A further object of this invention is to provide a process for operating an ethylene plant in combination with the regasification of natural gas at varying send-out rates which avoids the hereinabove noted problems.

Still another object of this invention is to recover the cold potential of liquefied natural gas while regasifying at varying send-out rates.

These and other objects will become more readily apparent from the following detailed description of the invention when read with reference to the accompanying drawing which is a schematic flow diagram of an embodiment of the invention.

The objects of the invention are accomplished by providing an ethylene plant having a maximum ethane feed rate that corresponds to the amount of ethane that can be recovered from liquefied natural gas at a send-out rate that is equal to the average send-out rate over a long period of time, e.g., several weeks. The actual send-out rate of the natural gas will vary above and below the average send-out rate, and accordingly, the amount of ethane available as feed to the ethylene plant will be above and below, respectively, the designed feed rate. Moreover, during such periods, there will be respective increases and decreases in the amount of cold potential available from liquefied natural gas. In accordance with the process of the invention, during periods of greater than average natural gas send-out rate, the amount of ethane and heavier fractions available from the liquefied natural gas that is in excess of that available during periods of average send-out rate is maintained in storage, and thus are available to make up the deficiency in such components during periods of less than average send-out rate. Thus, the fractionators downstream of the demethanizer and in the regasification plant and the ethylene plant may be operated at constant feed rates. The demethanizer of the liquefied natural gas regasification plant and equipment associated therewith are specially designed to operate at varying natural gas send-out rates.

The invention will be more fully understood from the description of a preferred embodiment of the invention which is illustrated in the drawing.

Referring to the drawing, liquefied natural gas (hereinafter referred to as "LNG") is withdrawn from a storage tank 10 through line 11 at a rate corresponding to the momentary demand of a gas distribution system, a rate which may be above or below, or at the average send-out rate. A portion of the LNG in line 11 is passed through line 12 and a first portion 13 of the regasification plant cold train, generally indicated at 14. The remaining portion of LNG in line 11 is passed through line 15 and a first portion 16 of the ethylene plant cold train, generally indicated at 17. The cold trains 14 and 17, as more fully described in application Ser. No. 316,048, are utilized to recover the cold potential of the LNG and are comprised of those portions of the respective plants which require refrigeration, e.g., the reflux condensers for the fractionators in both plants. The rate of flow through portions 13 and 16 of cold trains 14 and 17, respectively, are suitably balanced to provide the required refrigeration for both the regasification and ethylene plants. The liquefied natural gas from the first portions 13 and 16 of cold trains 14 and 17, respectively, is passed through lines 18 and 19, respectively, and introduced into a flash tank 21, operated at a temperature such that 30 to 35 percent of the total feed withdrawn from storage tank 10 is vaporized. LNG is withdrawn from flash tank 21 through line 22 and a first portion thereof passed through line 23 and the second portion 24 of the regasification cold train 14. The remaining portion of LNG in line 22 is passed through line 25 and the second portion 26 of the ethylene plant cold train 17. The LNG withdrawn from cold trains 14 and 17, respectively, is combined in line 27 for introduction into demethanizer 28.

Vaporized natural gas is withdrawn from flash tank 21 through line 29 and a first portion passed through line 31, the second portion 26 of the ethylene plant cold train 17 and line 32 for introduction into the demethanizer 28. The remaining portion of vaporized natural gas in line 29 is passed through line 33, the second portion 24 of the regasification plant cold train 14, and line 34 for combination with a portion of the overhead from demethanizer 28, as hereinafter more fully described. The flow rate of vaporized natural gas through lines 31 and 33 is regulated by suitable means, such as valves (not shown), so that the vaporized natural gas passed through line 33 is about equal to the flow rate of natural gas withdrawn from storage tank 10 in excess of the amount withdrawn therefrom during a period of average send-out rate. Thus, there will be no flow of vaporized natural gas through line 33 when the send-out rate is at or less than the average send-out rate. Accordingly, the total flow rate of feed to demethanizer 28 through lines 27 and 32 is always at or less than the flow rate during a period of average send-out rate.

The natural gas in lines 32 and the LNG in line 27 are introduced, at about the same temperature, into demethanizer 28, provided with suitable reboiler 35 to separate methane from ethane and heavier hydrocarbons. The demethanizer is designed to operate at feed rates which correspond to between 50 and 100 percent of the feed thereto during a period of an average send-out rate, with a constant reflux rate (constant reflux ratio on feed) being used for send-out rates greater than 100 percent. It is to be understood, however, that the 50 to 100 percent range is not mandatory, since the demethanizer can be designed to operate from a minimum to that at which the separation efficiency is not impaired by more than a tolerable amount.

An overhead, primarily comprised of methane is withdrawn from demethanizer 28 through line 36 and passed through a reflux condenser 37 to a separator 38. The condenser 37 forms a portion of the regasification cold train 14, as more fully described in application Ser. No. 316,048. The condensed methane portion is withdrawn from separator 38 and passed through line 39 to demethanizer 28 to meet the reflux requirements therefor. The uncondensed methane is withdrawn from separator 38 through line 41 and passed through a first superheater 42, combined with the vaporized natural gas in line 34, if any, and passed through a second superheater 43 to the natural gas distribution system (not shown). The superheaters 42 and 43 may be used to supply a portion of the refrigeration requirements for the ethylene plant.

A bottoms, primarily comprised of ethane, propane and butane, is withdrawn from demethanizer 28 through line 44 and passed through line 45 to deethanizer 46 during periods when the send-out rate is at or less than the average send-out rate. When the gas send-out rate is at a rate above the average send-out rate, a portion of the liquid in line 44 is passed through line 47 at a rate of flow such that the flow rate to deethanizer 46 through line 45 is equal to the rate of flow thereto when there is an average gas send-out rate. The liquid in line 47 is passed through the regasification plant cold train 14 wherein cooling is effected to a temperature at which the vapor pressure of the liquid is equal to one atmosphere. The required cooling is supplied by recovering all or part of the cold potential from the excess natural gas being withdrawn from storage tank 10 during this period of greater than average send-out rate. The cooled liquid from cold train 14 is passed through line 48 and introduced into an atmospheric storage tank 49.

When the send-out rate is below the average gas sendout rate, the liquid in storage tank 49, containing $C_2$ and heavier hydrocarbons, is withdrawn therefrom through line 51 for introduction into the deethanizer 46 at a flow rate such that the total feed introduced into deethanizer 46 through line 45 during this period is equal to the total feed introduced into deethanizer 46 during a period of average gas send-out rate. The liquid in line 51 is passed through the ethylene plant cold train 17 to recover the cold potential therefrom, thus compensating for the decreased flow rate of LNG therethrough from LNG storage tank 10. The liquid from cold train 17 is passed through line 52 and combined in line 45 with the bottoms from demethanizer 28 for introduction into deethanizer 46. It is to be understood that during this period of less than average gas send-out rate, all of the bottoms withdrawn from demethanizer 28 is passed through line 45 for introduction into the deethanizer 46.

The ethane and heavier hydrocarbons in line 45 are introduced into the deethanizer 46, provided with a suitable reboiler 53, to separate ethane from the heavier hydrocarbons. An overhead primarily comprised of ethane is withdrawn from deethanizer 46 through line 54 and passed through a reflux condenser 55 to a separator 56. The reflux condenser 55 constitutes a portion of the regasification plant cold train 14, in a manner similar to the condenser 37 of the demethanizer 28, as more fully described in application Ser. No. 316,048. The condensed ethane portion is withdrawn from separator 56 and passed through line 57 to deethanizer 46 to meet the reflux requirements therefor. The uncondensed ethane is withdrawn from separator 56 through line 58 and passed to an ethylene plant, generally indicated as 59, provided with pyrolysis heaters and fractionators for recovering the various fractions of the pyrolysis gas (not shown). The cooling requirements for the ethylene plant are supplied by recovering the cold potential of both the LNG withdrawn from storage tank 10 and $C'2$ and heavier hydrocarbons withdrawn from storage tank 49. The operation of the ethylene plant and the use of the ethylene plant cold trains are described in more detail in application Ser. No. 316,048.

A bottoms, primarily comprised of propane and butane is withdrawn from deethanizer 46 through line 61 and introduced into a depropanizer 62, provided with a suitable reboiler 63, to separate propane from the heavier hydrocarbons. An overhead, primarily comprised of propane is withdrawn from depropanizer 62 through line 64 and passed through a reflux condenser 65 to effect condensation thereof. The reflux condenser 65 forms a portion of the regasification plant cold train 14. A portion of the condensed propane is passed through line 66 to depropanizer 62 to meet the reflux requirements therefor and the remaining portion of condensed propane is passed to storage (not shown).

A bottoms is withdrawn from depropanizer 62 through line 67 and introduced into a debutanizer 68, provided with a reboiler 69, to separate butane from heavier hydrocarbons. A bottoms of heavier hydrocarbons is withdrawn from debutanizer 68 through line 71 and passed to storage (not shown). An overhead, primarily comprised of butane, is withdrawn through line 72 and passed through reflux condenser 73 to effect condensation thereof. The reflux condenser 73 forms a portion of the regasification cold train 14. A portion of the condensed butane is passed through line 74 to butanizer 68 to meet the reflux requirements therefor and the remaining portion is passed to storage (not shown).

It should be readily apparent that a wide variety of modifications may be made in the above-described embodiment without departing from the scope of the invention. Thus, the cold potential of the C'2 and heavier hydrocarbons in storage tank 49 may be recovered in the regasification plant cold train instead of the ethylene plant cold train or may be recovered in both cold trains.

In another modification, all of the hydrocarbon components heavier than methane may be used as feed for the ethylene plant. In such a modification, the fractionators downstream of the demethanizer 28 are omitted, and the ethane and heavier fractions are passed through line 45 directly to the ethylene plant. The other equipment functions, as described with reference to the drawing, to maintain a constant feed rate in line 45.

These modifications and numerous other modifications should be readily apparent to those skilled in the art from the teachings of the invention.

The process of this invention is extremely effective for recovering the normally gaseous components of a liquefied gas at varying send-out rates. The process is especially effective for a plant combining the regasification of natural gas with the production of ethylene since it enables the ethylene plant and fractionators in the regasification plant downstream of the demethanizer to operate at a constant feed rate, in spite of varying gas send-out rates. Moreover, the process of the invention provides the extra refrigeration required in the ethylene plant when the send-out rate of liquefied natural gas is below normal. It is to be understood, however, that the process of this invention is equally effective for the regasification of any gas at varying send-out rates where it is desired to maintain constant feed rates at some point in the operation.

Numerous modifications and variations of the present invention are possible in the light of the above teachings. It is therefore to be understood that the invention may be practiced otherwise than as specifically described.

What is claimed is:

1. A process for the regasification and fractionation of liquefied natural gas, comprising:
   a. heating liquefied natural gas and recovering the cold potential therefrom;
   b. introducing heated natural gas from step (a) into a demethanizer to recover a methane overhead and a bottoms of heavier components, said methane overhead recovery varying above and below a specific average amount;
   c. introducing a first portion of the bottoms from the demethanizer into a deethanizer, said deethanizer being operated at a feed rate corresponding to the amount of bottoms available from the demethanizer at the specific average amount of methane overhead recovery, said first portion being the entire bottoms during periods when the methane overhead recovery is no greater than the specific average amount and when the methane overhead recovery is in excess of the specific average amount, said first portion being less than the entire bottoms and corresponding to the bottoms available when the methane overhead recovery is at the specific average amount;
   d. cooling the remaining portion of the bottoms available during a period when the methane overhead recovery is greater than the specific average amount by indirect heat transfer with liquefied natural gas;
   e. passing the cooled remaining portion of bottoms to a storage zone;
   f. withdrawing remaining portion of bottoms from said storage zone during periods when the methane overhead recovery is less than the specific average amount at a rate corresponding to that required to maintain the feed rate to the deethanizer;
   g. heating the withdrawn remaining portion of bottoms and recovering the cold potential therefrom; and
   h. introducing the heated remaining portion of bottoms into the deethanizer to maintain said feed rate to the deethanizer.

2. The process of claim 1 wherein a portion of the liquefied natural gas is vaporized during the heating of step (a), a portion of the vaporized liquefied natural gas being combined with the overhead from the demethanizer when the methane overhead recovery is in excess of the specific average amount with the remainder of the vaporized and liquefied natural gas being introduced into the demethanizer, said portion of vaporized natural gas corresponding in amount to the excess of liquefied natural gas heated during the period when the methane overhead recovery is in excess of the specific average amount.

* * * * *